(12) United States Patent
Xydis

(10) Patent No.: US 6,456,958 B1
(45) Date of Patent: Sep. 24, 2002

(54) METHOD FOR ALLOWING A USER ACCESS TO AN ELECTRONIC DEVICE HAVING IMPROVED SECURITY

(75) Inventor: Thomas G. Xydis, Ann Arbor, MI (US)

(73) Assignee: Ensure Technologies, Inc., Ann Arbor, MI (US)

( * ) Notice: Subject to any disclaimer, the term of this patent is extended or adjusted under 35 U.S.C. 154(b) by 0 days.

(21) Appl. No.: 09/727,620

(22) Filed: Dec. 1, 2000

Related U.S. Application Data

(60) Provisional application No. 60/168,406, filed on Dec. 1, 1999.

(51) Int. Cl.[7] .............................. G01B 5/02; G06F 15/00
(52) U.S. Cl. .......................................... 702/158; 702/79
(58) Field of Search .............................. 702/57, 78, 79, 702/122, 124, 142, 143, 149–151, 157, 158, 159, 176–178, 188, 189, 193; 340/5.61, 572.1, 825.49

(56) References Cited

U.S. PATENT DOCUMENTS

| | | | | |
|---|---|---|---|---|
| 3,732,465 A | * | 5/1973 | Palmer ....................... 340/5.61 |
| 3,818,472 A | * | 6/1974 | Mauk et al. ............... 340/572.4 |
| 3,914,762 A | * | 10/1975 | Klensch ..................... 340/5.61 |
| 4,055,830 A | * | 10/1977 | Wilson et al. .............. 367/128 |
| 4,260,982 A | * | 4/1981 | DeBenedictis et al. ..... 340/539 |
| 4,890,266 A | * | 12/1989 | Woodward ................... 367/99 |
| 5,072,222 A | * | 12/1991 | Fockens ...................... 342/44 |
| 5,131,038 A | * | 7/1992 | Puhl et al. .................. 340/5.61 |
| 5,293,160 A | * | 3/1994 | Kurozu et al. ............... 340/5.3 |
| 5,467,082 A | * | 11/1995 | Sanderson ................... 340/5.61 |
| 5,661,471 A | * | 8/1997 | Kotlicki ................... 340/825.37 |
| 5,708,421 A | * | 1/1998 | Boyd ...................... 340/573.1 |
| 5,821,854 A | * | 10/1998 | Dorinski et al. ............ 340/539 |
| 6,009,358 A | | 12/1999 | Angott et al. ................. 701/25 |
| 6,137,480 A | * | 10/2000 | Shintani ..................... 345/169 |

* cited by examiner

Primary Examiner—Marc S. Hoff
Assistant Examiner—Manuel L. Barbee
(74) Attorney, Agent, or Firm—Howard & Howard

(57) ABSTRACT

A security apparatus and a method for determining the distance between a computer (72) and a token (70) carried by a user (52) for allowing the user (52) to access the computer (72). The computer (72) is connected to a first transceiver (16) having at least one antenna for emitting and detecting a radio frequency (RF) signal, and to a microphone (76) for detecting an audio signal (24). The computer (72) is also connected to a counter (26) for measuring a time interval (28) between a transmitted RF signal (20) and audio signal (24) from the token (70). The token (70) is connected to a second transceiver (30) having at least one antenna for emitting and detecting a RF signal (20) and a loudspeaker (74) for emitting an audio signal (24). The method is characterized by comparing the measured time interval (28) to a predetermined time range (38) and enabling the computer (72) in response to the time interval (28) being within the predetermined time range (38) such that the user (52) may have access to the enabled computer (72) and disabling the computer (72) in response to the time interval (28) being outside the predetermined time range (38).

16 Claims, 5 Drawing Sheets

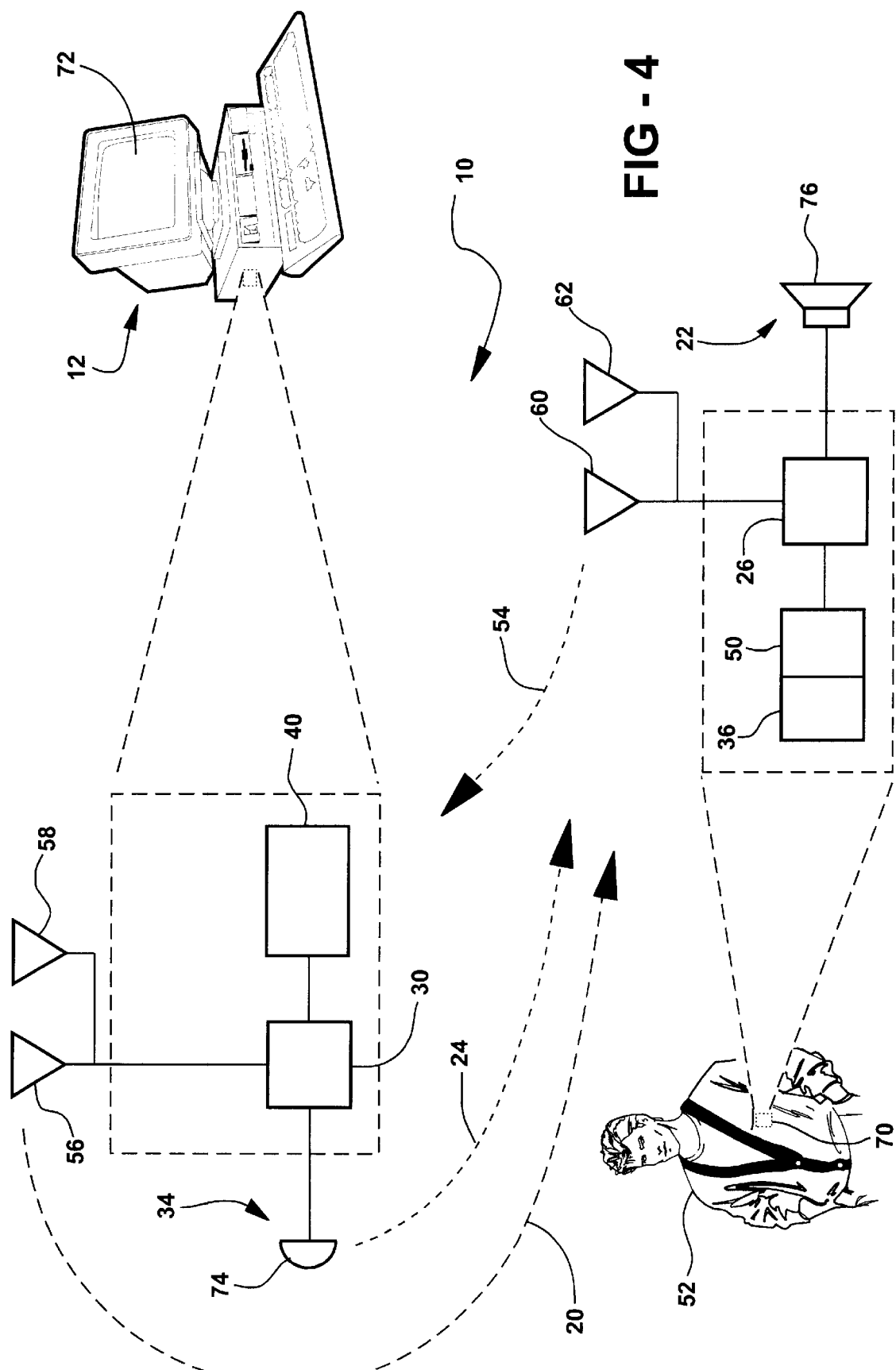

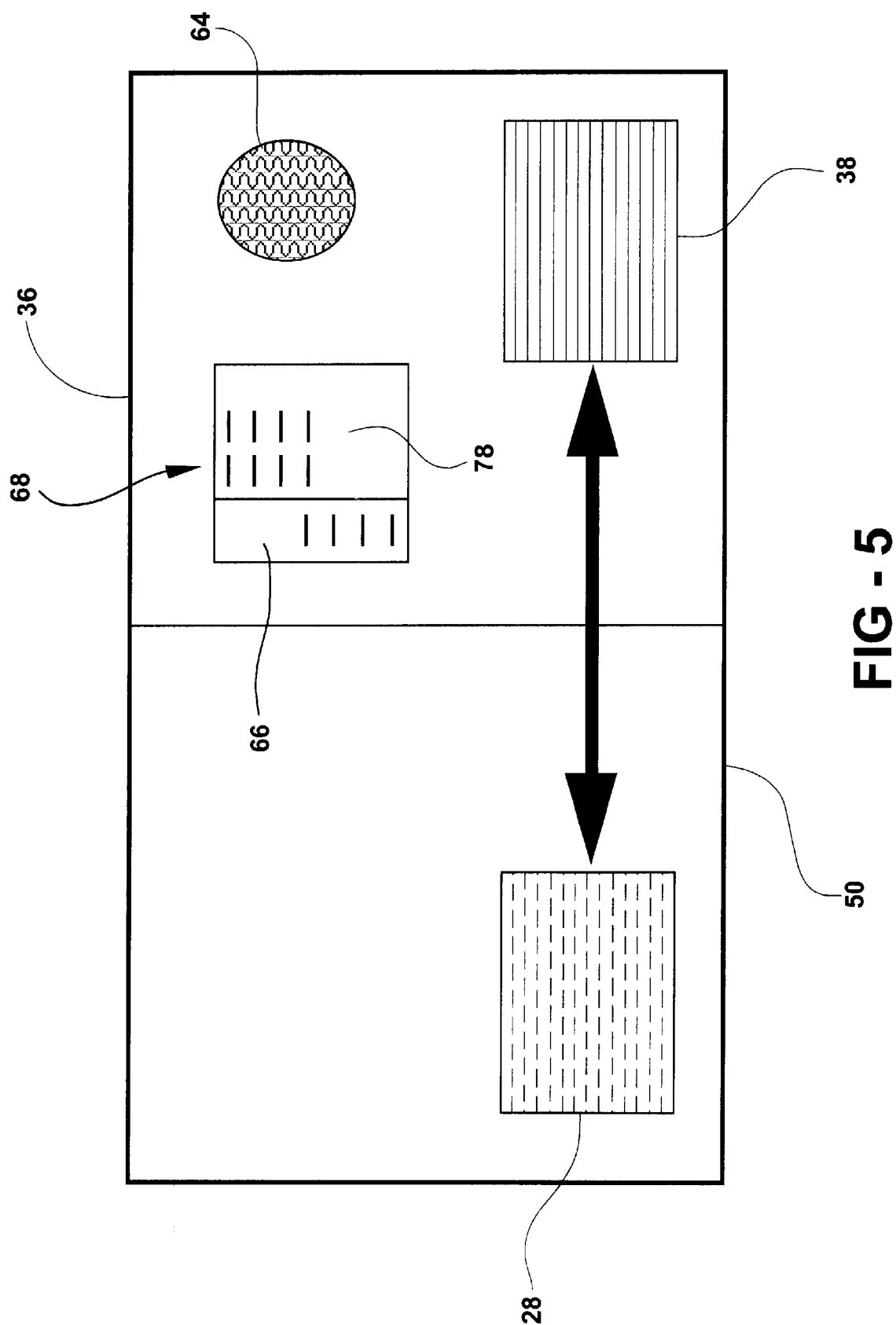

METHOD FOR ALLOWING A USER ACCESS TO AN ELECTRONIC DEVICE HAVING IMPROVED SECURITY

RELATED APPLICATIONS

This application claims priority to provisional patent application Serial No. 60/168,406 which was filed on Dec. 1, 1999.

BACKGROUND OF THE INVENTION

1. Field of the Invention

The subject invention relates to a security apparatus for an electronic device and a method of determining the distance between a first electronic device and a second electronic device for allowing a user access to one of the first and the second electronic devices.

2. Description of the Prior Art

The prior art includes various security apparatuses and methods of determining the distance or proximity between a first electronic device and a second electronic device. The methods include the steps of emitting. a radio frequency (RF) signal and an audio signal simultaneously from the first electronic device, detecting the RF signal and the audio signal with the second electronic device, and measuring a time interval between the detection of the RF signal and detection of the audio signal by the second electronic device.

One such method is shown in U.S. Pat. No. 6,009,358 to Angott et al. The '358 Patent discloses using radio frequency (RF) signals and audio signals to determine the position of a lawnmower in a plot of land. The lawnmower position is determined and then the position is corrected to a memorized route which the lawnmower is programmed to follow. If the route was not preprogrammed into the lawnmower, the position of the lawnmower would not be corrected and no response would be taken.

Another similar method is shown in U.S. Pat. No. 5,821,854 to Dorinski et al. The method utilizes radio frequency (RF) signals to determine the proximity of a user to a computer. When the strength of the RF signal falls below a predetermined threshold, an inaudible sound is emitted and the computer locks when it detects the inaudible sound.

Note that none of the prior art references enable or disable the device in response to the position of the device. Accordingly, there is a need for an apparatus and a method which determines the proximity of the user within a predetermined time range or radius and enables and disables the device to protect valuable information that is increasingly being stored on electronic devices and decrease the likelihood of information theft.

SUMMARY OF THE INVENTION AND ADVANTAGES

The subject invention provides a security apparatus and a method of determining the distance between a first electronic device and a second electronic device for allowing a user to access one of the first and the second electronic devices. The apparatus comprises a first electronic device and a second electronic device. The first electronic device includes a first transceiver connected to the first electronic device and having at least one antenna for emitting and detecting a radio frequency (RF) signal, a first detector connected to the first electronic device for detecting an audio signal, and a counter connected to the first electronic device for measuring a time interval between a transmitted RF signal and audio signal from the second electronic device.

The second electronic device includes a second transceiver connected to the second device and having at least one antenna for emitting and detecting a RF signal, a transmitter connected to the second electronic device for emitting an audio signal.

The apparatus is characterized by a first processor connected to the first electronic device for comparing the measured time interval to a predetermined time range and enabling one of the first and second electronic devices in response to the time interval being within the predetermined time range and disabling one of the first and second electronic devices in response to the time interval being outside the predetermined time range.

The method comprises the steps of emitting a radio frequency (RF) signal and an audio signal simultaneously from the second electronic device, detecting the RF signal and audio signal with the first electronic device, and measuring a time interval between the detection of the RF signal and detection of the audio signal by the second electronic device.

The method is characterized by comparing the measured time interval to a predetermined time range and enabling one of the first and the second electronic devices in response to the time interval being within the predetermined time range such that the user may have access to the enabled electronic device and disabling one of the first and the second electronic devices in response to the time interval being outside the predetermined time range such that the user cannot have access to the disabled electronic device.

The subject invention provides for a more secure electronic system by determining the proximity of the user from the electronic device and disabling the electronic device to prevent information theft when the user is outside of a predetermined radius.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a schematic view of a first electronic device being a token carried by a user and second electronic device being a computer and emitting signals from the computer to the token; and FIG. 5 is a schematic view of the first processor having an authorized user database with authorized user codes, a predetermined time range, and a predetermined radius and a measurement device for measuring a time interval.

DETAILED DESCRIPTION OF THE PREFERRED EMBODIMENT

Figure 1:
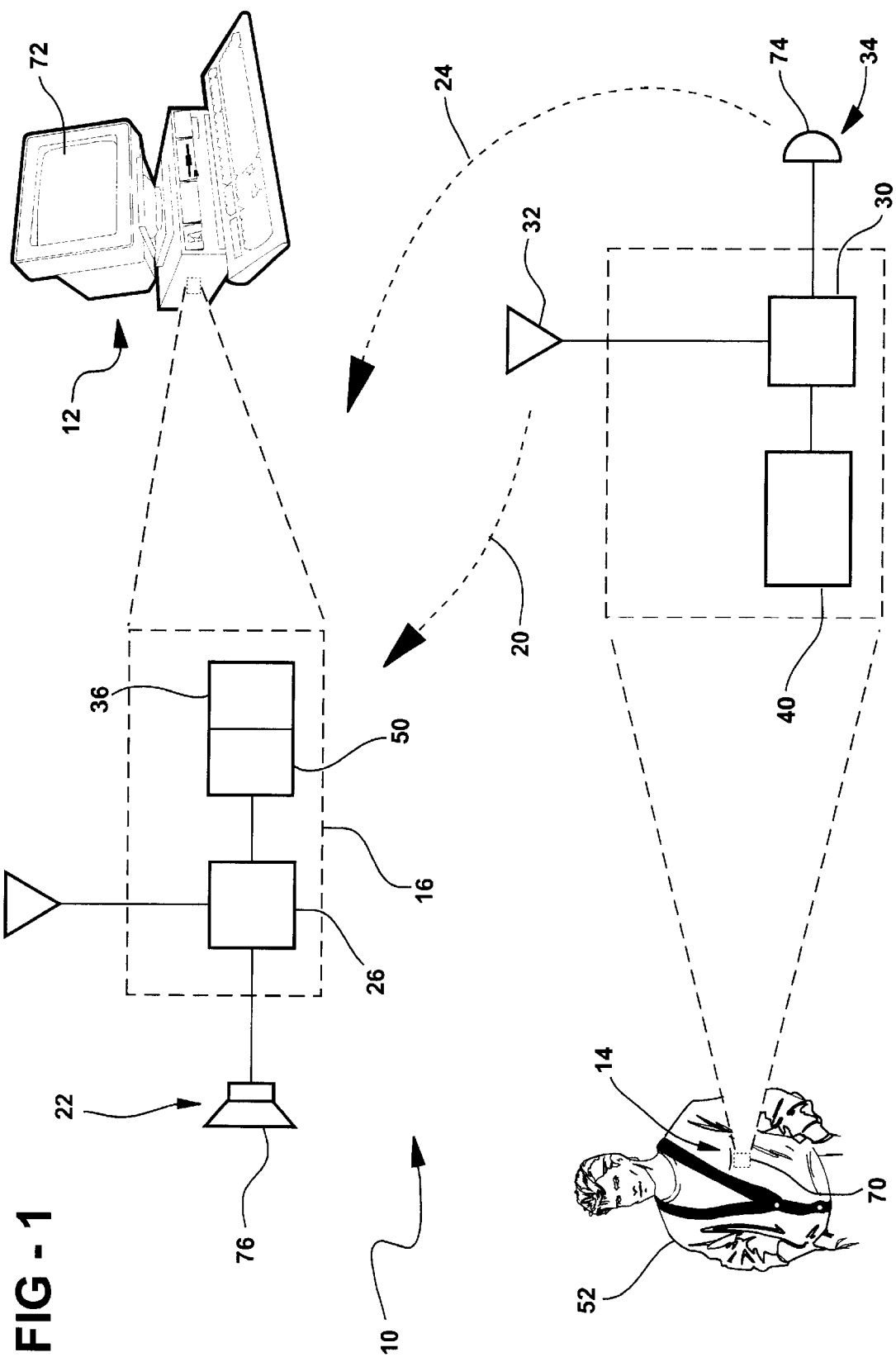
FIG. 1 is a schematic view of a first electronic device being a computer and second electronic device being a token carried by a user and emitting signals from the token to the computer.

Referring to the FIGURES, wherein like numerals indicate like or corresponding parts throughout the several views, a security apparatus and a method for determining the distance between a first electronic device 12 and a second electronic device 14 for allowing a user 52 to access one of the first and the second electronic devices 12, 14 is generally shown at 10.

The security apparatus comprises the first electronic device 12 and the second electronic device 14. In the preferred embodiment, FIG. 1, the first electronic device 12 is a computer 72 and the second electronic device 14 is a token 70. Although the invention is described for use with a computer, it is equally applicable to a cellular phone, PDA, laptop computer, or printer.

The computer 72 is connected to a first transceiver 16, having at least one antenna 18 for emitting and detecting a radio frequency (RF) signal 20, as is known in the art of emitting and detecting RF signals. A first detector 22 is connected to the computer 72 for detecting an audio signal 24, which is preferably a microphone 76 being able to detect the audio signal 24. The computer 72 is also connected to a counter 26 for measuring a time interval 28 between a transmitted RF signal 20 and audio signal 24 from the token 70.

The token 70, shown in FIG. 1, includes a second transceiver 30 having at least one antenna 32 for emitting and detecting the RF signal, as is known in the art of emitting and detecting RF signals. A transmitter 34 is connected to the token 70 for emitting an audio signal 24, wherein the transmitter 34 is preferably a loudspeaker 74 for propagating the audio signal 24. The token 70 is a card or badge that can be carried easily by the user 52. The token 70 could also be incorporated into a pager or any other device which is issued exclusively to one user.

The apparatus is characterized by a first processor 36 connected to the computer 72 for comparing the measured time interval 28 to a predetermined time range 38. If the time interval 28 is within the predetermined time range 38, as shown in FIG. 5, then the computer 72 is enabled. if the time interval 28 is outside the predetermined time range 38, then the computer 72 is disabled. When the computer 72 is enabled, power is supplied to the computer 72 and the computer 72 is ready to be used or is ready to authorize the identity of the user 52. When the computer 72 is disabled, power may still be supplied and showing a locked screen, therefore the computer 72 will not respond to the detection of the RF signals. Moreover, for increased security, when the computer 72 is disabled, the power supply could be discontinued and computer 72 will shut down. Initially, the computer 72 may be disabled and the token 70 emits an initiation signal 54 when approaching the computer 72. For instance, when the user 52 first starts work in the morning or when the computer 72 needs to be shut down. The initiation signal 54 causes the computer 72 to wake up and respond to the token 70 with a request for the RF signal 20 and audio signal 24.

A second processor 40 is also connected to the token 70 to perform an identical function as the first processor 36. The second processor 40 allows for bidirectional communication between the token 70 and the computer 72.

Figure 3:
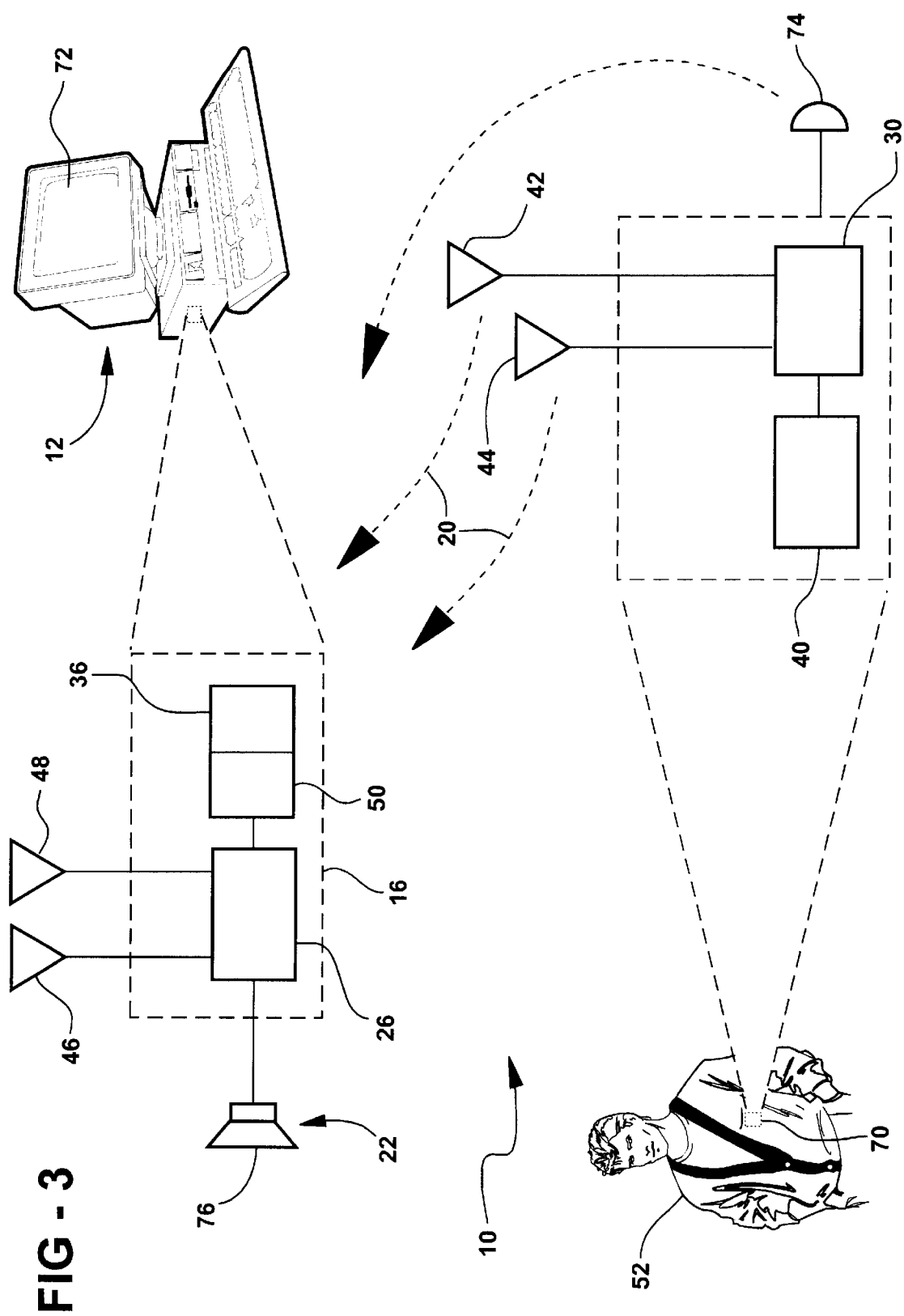
FIG. 3 is a schematic view of a first electronic device being a computer and second electronic device being a token carried by a user and emitting sequential signals from the token to the computer and detecting the signals with multiple antennas.

Another features of the first embodiment, shown in FIG. 3, includes the token 70 including a first emitting antenna 42 and a second emitting antenna 44 for sequentially emitting the RF signal 20. The first emitting antenna 42 and the second emitting antenna 44 are preferably spaced apart from and orthogonal to one another. The token 70 is able to emit the same signal from both of the emitting antennas 42, 44 in the same direction towards the computer 72.

The computer 72 includes a first detecting antenna 46 and a second detecting antenna 48 for increasing the detection of the emitted RF signal 20, shown in FIG. 3. Preferably, the first detecting antenna 46 and the second detecting antenna 48 are positioned transverse to one another. The multiple detecting antennas 46, 48 assist the computer 72 is detecting RF signal 20 which may be reflected off obstacles between the computer 72 and the token 70.

The apparatus of the first embodiment further includes a measurement device 50 connected to the computer 72 for measuring the strength of the RF signal 20 that was detected. The first processor 36 then compares the signal strength to a predetermined threshold 54 for initiating the measurement of the time interval 28. If the computer 72 has the first and the second detecting antenna 46, 48, the strength of the signal detected by each of the antennas 46, 48 is compared to the predetermined threshold 54. So long as the maximum signal strength detected at one of the antennas is above the predetermined threshold 54, the measurement of the time interval 28 will begin at the detection of the RF signal 20. This allows the audio signal 24 to only be utilized when detected RF signal 20 strength falls below the predetermined threshold 54. In other words, both the RF signal 20 and the audio signal 24 are used for the initial verification and then the user's continued access is based upon the detected RF signal 20 strength. When the RF signal 20 strength falls below the predetermined threshold 54, the computer 72 requests the token 70 to emit both the RF signal 20 and the audio signal 24 to verify the presence of the user 52 within the predetermined time range 38.

Figure 2:
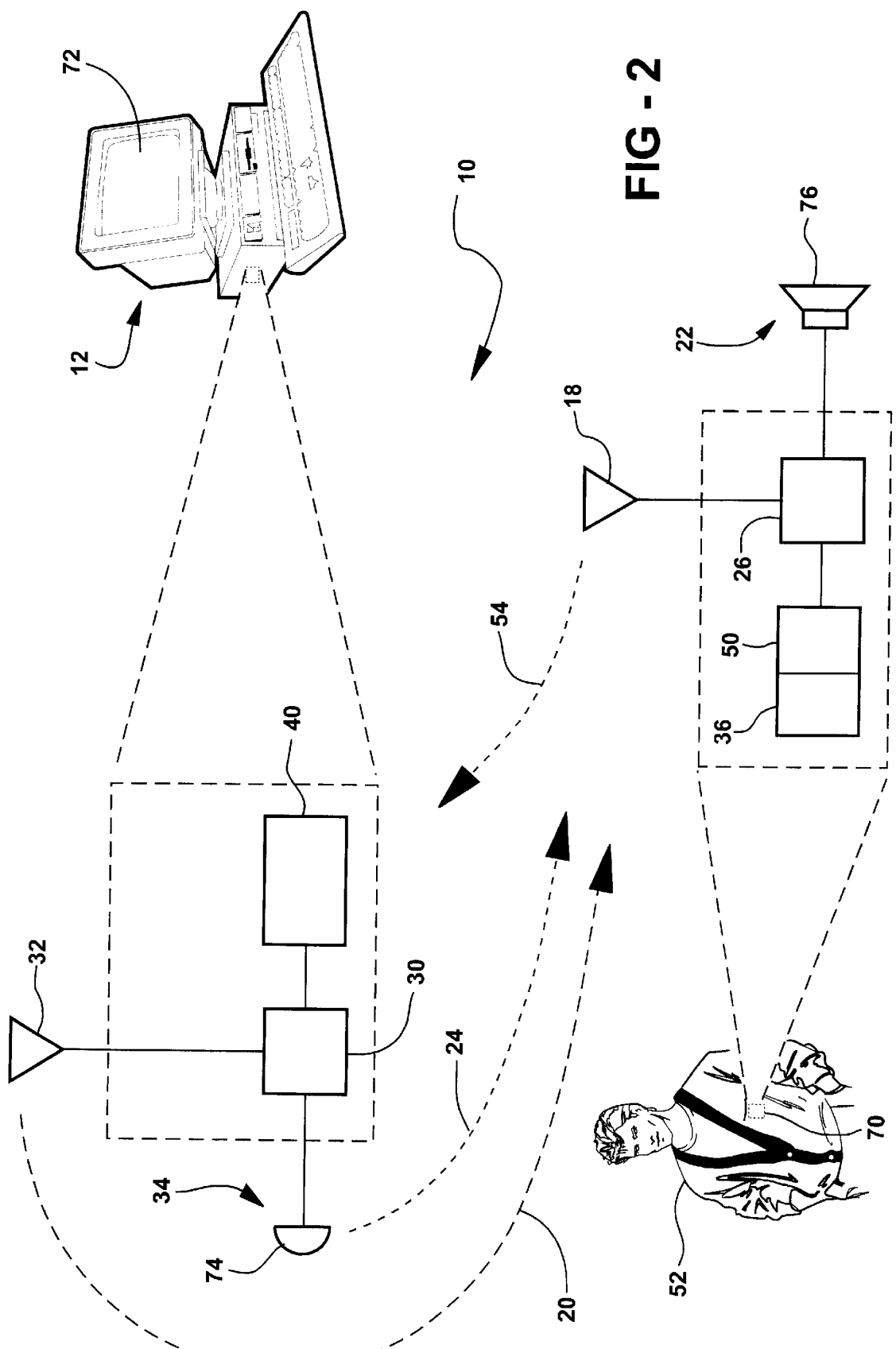
FIG. 2 is a schematic view of a first electronic device being a token carried by a user and second electronic device being a computer and emitting signals from the computer to the token.

In a second embodiment, FIG. 2, the first electronic device is the token 70 and the second electronic device is the computer 72. As shown in FIG. 2, the computer 72 emits the audio signal 24 from the loudspeaker 74 and the token 70 detects the audio signal 24 with the microphone 76. The token 70 then measures the time interval 28 and compares it to the predetermined time range 38. If the time interval 28 is within the predetermined time range 38, the token 70 sends a response signal to the computer 72 for enabling the computer 72. If the time interval 28 is outside the predetermined time range 38, the token 70 sends the response signal to disable the computer 72. Additionally, the token 70 may not send the response signal if outside the predetermined time range 38 and the computer 72 may automatically disable in response to not detecting the response signal from the token 70.

In the second embodiment, shown in FIG. 4, the computer 72 includes a third emitting antenna 56 and a fourth emitting antenna 58 for sequentially emitting the RF signal 20 as discussed above and performs an identical function as the token 70 of the first embodiment. The token 70 includes a third detecting antenna 60 and a fourth detecting antenna 62 for increasing the detection of the emitted RF signal 20 as discussed above and performs an identical function as the computer 72 of the first embodiment.

The apparatus of the second embodiment further includes the measurement device 50 connected to the token 70 for measuring the strength of the RF signal 20 that was detected. The first processor 36 then compares the signal strength to a predetermined threshold 54 for initiating the measurement of the time interval 28. If the token 70 has the third and the fourth detecting antenna 60, 62, the strength of the signal detected by each of the antennas is compared to the predetermined threshold 54. So long as the maximum signal strength detected at one of the antennas is above the predetermined threshold 54, the measurement of the time interval 28 will begin at the detection of the RF signal 20.

The method is described as being accomplished with the first embodiment discussed above. However, the method may be practiced with any of the aforementioned embodiments. The method comprises the steps of emitting the RF signal 20 and an audio signal 24 simultaneously from the token 70, detecting the RF signal 20 and the audio signal 24 with the computer 72, and measuring a time interval 28 between the detection of the RF signal 20 and detection of the audio signal 24 by the token 70. The step of emitting the RF signal 20 and the audio signal 24 further includes emitting the RF signal 20 having a first velocity and the audio signal 24 having a second velocity, wherein the second velocity is the speed of sound.

The method is characterized by comparing the measured time interval 28 to a predetermined time range 38, shown in FIG. 5. As discussed above, the computer 72 is enabled in response to the time interval 28 being within the predetermined time range 38 such that the user 52 may have access to the enabled computer 72. The user 52 may still be required to validate his identity by way of biometrics, keyword entry, or other means as is known in the art. The computer 72 is disabled in response to the time interval 28 being outside the predetermined time range 38 such that the user 52 cannot have access to the disabled computer 72.

The first processor 36 may also calculate a distance between the computer 72 and the token 70. Once the time interval 28 is measured, the speed of sound is used to calculate the distance. The calculated distance is then compared to a predetermined radius 64 and the computer 72 is enabled if the token 70 is within the predetermined radius 64 and disabled if the token 70 is outside the predetermined radius 64. The predetermined radius 64 is selected by the administrator to determine the maximum distance the user 52 may be apart from the computer 72. If the information that the user 52 is working on is highly classified, the administrator may set a very small predetermined radius 64 to prevent information theft.

The step of emitting the RF signal 20 also includes emitting a user code 66 and comparing the user code to an authorized user database 68, as shown in FIG. 5. The authorized user database 68 has authorized user codes 78 and allowing the user 52 to access the previously enabled electronic device in response to the user code matching an authorized user code.

For example, the preferred embodiment allows the user 52 having the token 70 to approach his computer 72 and be authorized to access the computer 72 software.

The token 70 emits the RF signal 20 and the audio signal 24 and the computer 72 detects the RF signal 20. The computer 72 measures the strength of the signal and begins measuring the time interval 28 until the audio signal 24 is detected. The computer 72 then compares the measured time interval 28 to the predetermined time range 38 and enables the computer 72, if the time interval 28 is within the predetermined time range 38. Once enabled, the computer 72 periodically emits a request for the token 70 to emit the RF signal 20 or for the token 70 to periodically emit the RF signal 20 as the administrator desires. The computer 72 continues to measure the strength of the RF signal 20 and compare it to the predetermined threshold 54. When the RF signal 20 drops below the predetermined threshold 54, the computer 72 requests the token 70 to transmit both the RF signal 20 and the audio signal 24 to verify the presence of the user 52 within the predetermined time range 38. This prevents the computer 72 from prematurely disabling when the RF signal 20 drops below the predetermined threshold 54.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method for allowing a user access to one of a first and a second electronic devices having improved security to prevent information theft, said method comprising the steps of;

emitting a radio frequency (RF) signal and an audio signal (24) simultaneously from the second electronic device (14), detecting the RF signal (20) with the first electronic device (12), detecting the audio signal (24) with the first electronic device (12), and measuring a time interval (28) between the detection of the RF signal (20) and detection of the audio signal (24) by the second electronic device (14), comparing the measured time interval (28) to a predetermined time range (38), enabling one of the first and the second electronic devices in response to the time interval (28) being within the predetermined time range (38) such that access to the enabled electronic device is provided to the user (52) in the proximity of the electronic device, and disabling one of the first and the second electronic devices in response to the time interval (28) being outside the predetermined time range (38) such that access to the disabled electronic device is denied when the user (52) is not in the proximity of the electronic device.

2. A method as set forth in claim 1 including calculating a distance between the first electronic device (12) and the second electronic device (14) utilizing the time interval (28), comparing the distance to a predetermined radius (64), and enabling one of the first and the second electronic devices in response to one of the devices being within the predetermined radius (64) and disabling one of the first and the second electronic devices in response to the devices being outside the predetermined radius (64).

3. A method as set forth in claim 2 wherein the step of emitting the RF signal (20) and the audio signal (24) simultaneously from the second electronic device (14) is further defined by emitting the RF signal (20) at a first velocity and emitting the audio signal (24) at a second velocity simultaneously from the first electronic device (12).

4. A method as set forth in claim 3 wherein the step of emitting the audio signal (24) at the second velocity is further defined by emitting the audio signal (24) at the speed of sound.

5. A method as set forth in claim 3 wherein the step of calculating the distance between the first electronic device (12) and the second electronic device (14) is further defined by calculating the distance by using the measured time interval (28) and the second velocity.

6. A method as set forth in claim 1 wherein the step of emitting the audio signal (24) is further defined as periodically emitting the audio signal (24) for verifying the continued presence of the user (52) within the predetermined time range (38).

7. A method as set forth in claim 1 including measuring the strength of the RF signal (20) and comparing the strength of the RF signal (20) to a predetermined threshold (54) for initiating the measurement of the time interval (28).

8. A method as set forth in claim 7 wherein the step of measuring the strength of the RF signal (20) further includes verifying the presence of the user (52) within the predetermined time interval (28) by comparing the strength of the RF signal (20) to the predetermined threshold (54).

9. A method as set forth in claim 8 wherein the step of emitting the audio signal (24) is further defined as emitting the audio signal (24) for verifying the continued presence of the user (52) within the predetermined time range (38) in response the RF signal (20) falling below the predetermined threshold (54).

10. A method as set forth in claim 1 wherein the steps of emitting and detecting of the RF signal (20) is further defined by emitting and detecting a user code and comparing the user code to an authorized user database having authorized user codes and allowing the user (52) to access the previously enabled electronic device in response to the user code matching an authorized user code.

11. A method as set forth in claim 1 wherein the step of emitting the RF signal (20) is further defined by sequentially emitting the RF signal (20) from a first emitting antenna (42) and a second emitting antenna (44).

12. A method as set forth in claim 1 wherein the step of detecting the RF signal (20) includes detecting the RF signal (20) with a first detecting antenna and a second detecting antenna.

13. A method as set forth in claim 1 wherein the emitting of the RF signal (20) and the audio signal (24) includes emitting the RF signal (20) and the audio signal (24) from a computer (12).

14. A method as set forth in claim 13 wherein the detecting of the RF signal (20) and audio signal (24) includes detecting the signals with a token (70) carried by the user (52).

15. A method as set forth in claim 1 wherein the emitting of the RF signal (20) and audio signal (24) includes emitting the signals from a token (70) carried by the user (52).

16. A method as set forth in claim 15 wherein the detecting of the RF signal (20) and audio signal (24) includes detecting the signals with a computer (72).

* * * * *